(12) United States Patent
Zuo

(10) Patent No.: US 10,817,617 B1
(45) Date of Patent: Oct. 27, 2020

(54) DATA LOSS PREVENTION FOR BIOMETRIC DATA

(71) Applicant: CA, INC., San Jose, CA (US)

(72) Inventor: Jinyu Zuo, San Francisco, CA (US)

(73) Assignee: CA, Inc., San Jose, CA (US)

( * ) Notice: Subject to any disclaimer, the term of this patent is extended or adjusted under 35 U.S.C. 154(b) by 231 days.

(21) Appl. No.: 16/022,485

(22) Filed: Jun. 28, 2018

(51) Int. Cl.
*G06F 21/62* (2013.01)
*H04L 29/06* (2006.01)

(52) U.S. Cl.
CPC ...... *G06F 21/6227* (2013.01); *G06F 21/6218* (2013.01); *G06F 21/6245* (2013.01); *H04L 63/20* (2013.01)

(58) Field of Classification Search
CPC ...... G06F 21/32; G06F 21/6227; G06F 21/62; G06F 21/6218; G06F 21/6281; H04L 63/0861; H04L 63/101
See application file for complete search history.

(56) References Cited

U.S. PATENT DOCUMENTS

| | | | | |
|---|---|---|---|---|
| 2010/0257369 | A1* | 10/2010 | Baker | G06F 21/32 713/186 |
| 2012/0303558 | A1* | 11/2012 | Jaiswal | G06N 20/00 706/12 |
| 2016/0070905 | A1* | 3/2016 | Antoun | G06F 21/50 726/1 |
| 2016/0087999 | A1* | 3/2016 | Schneider | H04L 63/1408 726/22 |
| 2016/0162673 | A1* | 6/2016 | Kutliroff | G06F 21/32 382/115 |
| 2016/0294839 | A1* | 10/2016 | Walline | H04W 12/0808 |
| 2017/0041297 | A1* | 2/2017 | Ling | H04L 63/20 |
| 2018/0276393 | A1* | 9/2018 | Allen | H04W 12/02 |

* cited by examiner

*Primary Examiner* — David J Pearson
(74) *Attorney, Agent, or Firm* — FisherBroyles, LLP

(57) ABSTRACT

A set of DLP rules are enforced to prevent loss of biometric data on a computing device. Attempts to perform operations targeting biometric data are detected, and the specific biometric data being targeted is identified. It is determined whether given attempted operations targeting biometric data are permitted, according to the set of DLP rules. This can take the form of enforcing DLP rules governing attempted operations based on factors such as the type of biometric data, quantity of biometric data, quality of biometric data, target of an attempt to transmit biometric data, specific users and/or applications that initiated attempted operations, specific people represented by the biometric data, relationships between them, etc. In response to determining that a specific attempted operation targeting biometric data is not permitted according to the DLP rules, the operation is blocked. If the DLP rules do not prohibit the operation, its execution is permitted.

20 Claims, 5 Drawing Sheets

DATA LOSS PREVENTION FOR BIOMETRIC DATA

TECHNICAL FIELD

This disclosure pertains generally to computer security and data loss prevention, and more specifically to data loss prevention for biometric data.

BACKGROUND

With the widespread use of cloud based storage and mobile computing devices, enterprises and other organizations are subject to loss and leakage of their sensitive information, as a result of both inadvertent and malicious user activity. An organization's data loss prevention policy can identify sensitive information, and specify how it may and may not be accessed and used. For example, within a given company certain members of the Human Resources department may be authorized to access personal employee information such as home addresses and social security numbers. However, taking such information away from the company, either intentionally or inadvertently, could be a violation of company policy.

Biometric data is often utilized today within organizations, for example in the context of IT security systems or employee records. Fingerprint data, iris scans, facial images or geometry and other forms of biometric data can be maintained within organizations, and utilized, for example, as second factors in multi-factor authentication systems. In addition, photographs of employees may be maintained within the company (e.g., by the HR department), including high resolution facial images. Many organizations fail to protect biometric data with a level of rigor appropriate for such sensitive information. Even when organizations take note of the special sensitivity of biometric data, no precautions geared specifically to protecting their biometric data are taken, other than treating the biometric data as generic "sensitive and confidential" information.

It would be desirable to address these issues.

SUMMARY

A set of data loss prevention ("DLP") rules are enforced to prevent loss of biometric data on a computing device. Attempts to perform operations targeting data on the computing device are detected. For example, attempts to transfer files off the computing device are detected, such as attempts to copy files to a network share, save files to a removable medium (e.g., a USB stick or the like), attach files to emails or text messages, and/or copy files to remote computers. In such scenarios, the destination of the attempted transfer operation can be tracked, and utilized in the enforcement of the DLP rules. Other types of information that can be tracked and used in this capacity include, for example, users and/or applications that initiate detected attempts to perform operations targeting data on the computing device.

It is determined when attempted operations are targeting biometric data. In other words, it is identified that the data targeted by a given attempted operation comprises biometric data. The specific biometric data being targeted by attempted operations can be identified. Specific biometric data in various formats can be identified by, for example, programmatically interfacing with software tools that process biometric data in such non-image formats. Such biometric data can be in the form of, for example mathematical descriptions of facial geometry, mathematical descriptions of hand geometry, ear shape descriptors, mathematical descriptions of voice signatures, fingerprint minutiae points, binary iris codes, retina descriptors, and DNA descriptors. Another way in which biometric data can be identified is the analysis of raw biometric data files (e.g., utilizing automated facial recognition to identify facial images).

It is determined whether given attempted operations targeting biometric data are permitted, according to the set of DLP rules. This can take the form of enforcing DLP rules governing attempted operations based on factors such as the type of the biometric data, the quantity of the biometric data, the quality of the biometric data, the target of an attempt to transmit biometric data off the computing device, specific users and/or applications that initiated attempted operations, one or more specific people represented by the biometric data, relationships between people represented by the biometric data and/or users that initiated attempted access operations, etc.

In response to determining that a specific attempted operation targeting the biometric data is not permitted according to the DLP rules, the attempted operation is blocked. On the other hand, if the DLP rules do not prohibit the attempted operation, the execution of the attempted operation is permitted. Other options are also possible in some embodiments, such as redacting some or all of the biometric data but permitting the operation, automatically performing additional security actions, etc.

Biometric data and related contextual information maintained by an organization can be automatically processed. Examples of such information include stored facial images of employees, badge photographs, org charts and the like, as well as identification and context of, for example, facial geometry or iris scans of employees used by an organization-level authentication system. The automatically processed biometric data and contextual information can be enrolled with the system, and used in the enforcement of the set of DLP rules.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
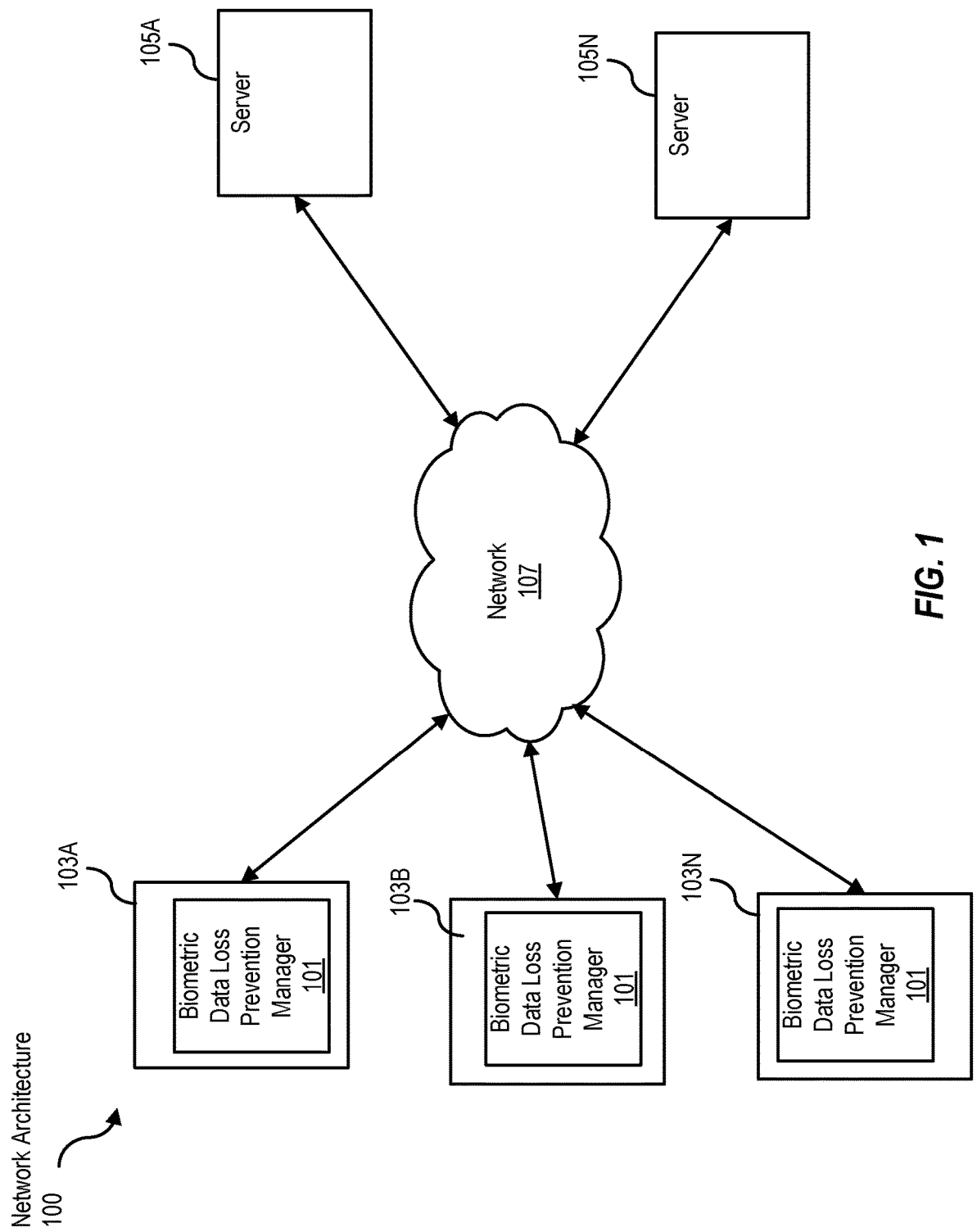
FIG. 1 is a block diagram of an exemplary network architecture in which a biometric data loss prevention manager can be implemented, according to some embodiments.

FIG. 1 is a block diagram illustrating an exemplary network architecture 100 in which a biometric data loss prevention manager 101 can be implemented. The illustrated network architecture 100 comprises multiple clients 103A, 103B and 103N, as well as multiple servers 105A and 105N. In FIG. 1, a biometric data loss prevention manager 101 is illustrated as residing on each client 103A-N. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications (e.g., smartphones, tablet computers, wearable computing devices, etc.).

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
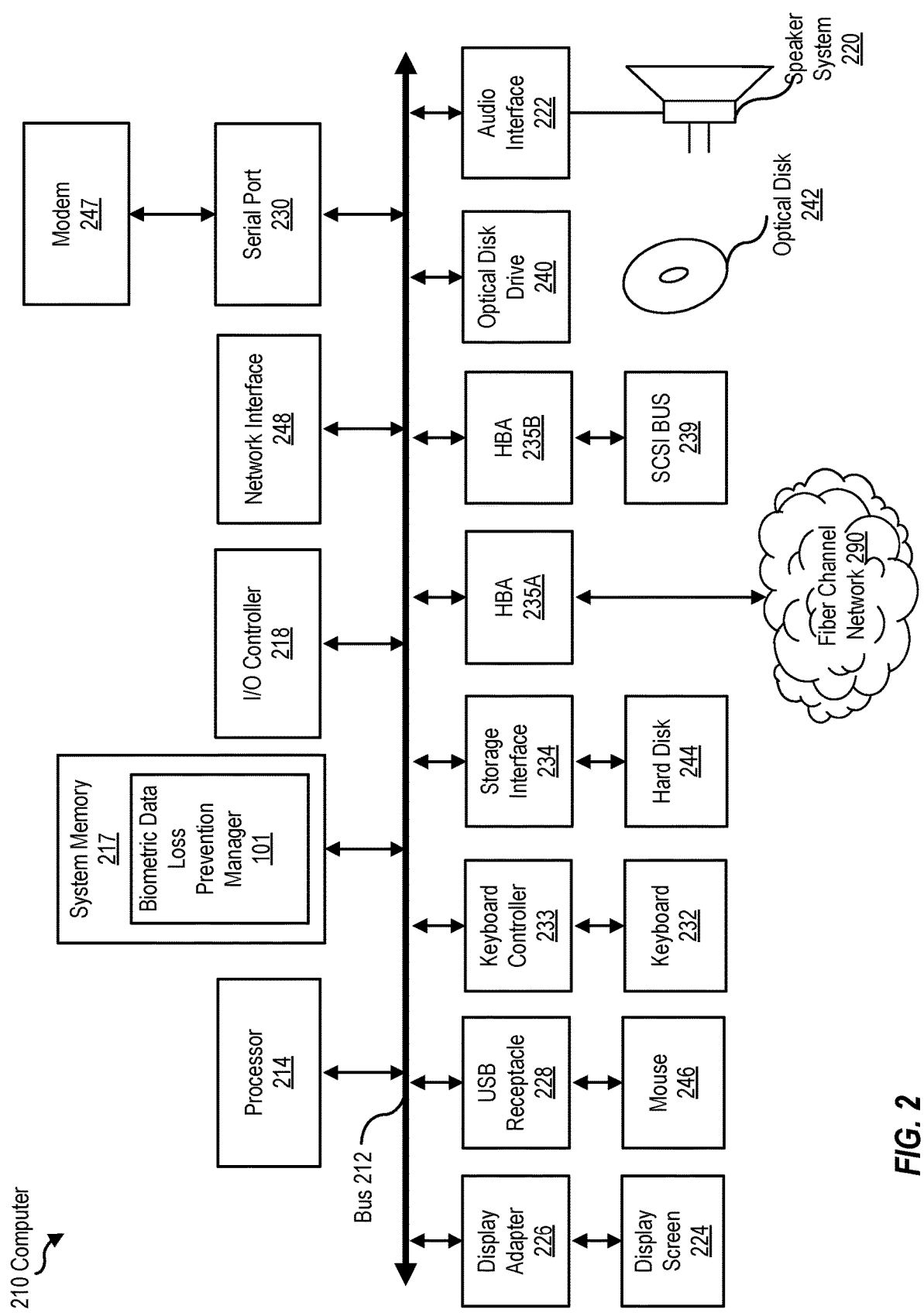
FIG. 2 is a block diagram of a computer system suitable for implementing a biometric data loss prevention manager, according to some embodiments.

FIG. 2 is a block diagram of a computer system 210 suitable for implementing a biometric data loss prevention manager 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of data storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the biometric data loss prevention manager 101 is illustrated as residing in system memory 217. The workings of the biometric data loss prevention manager 101 are explained in greater detail below in conjunction with FIGS. 3-5.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
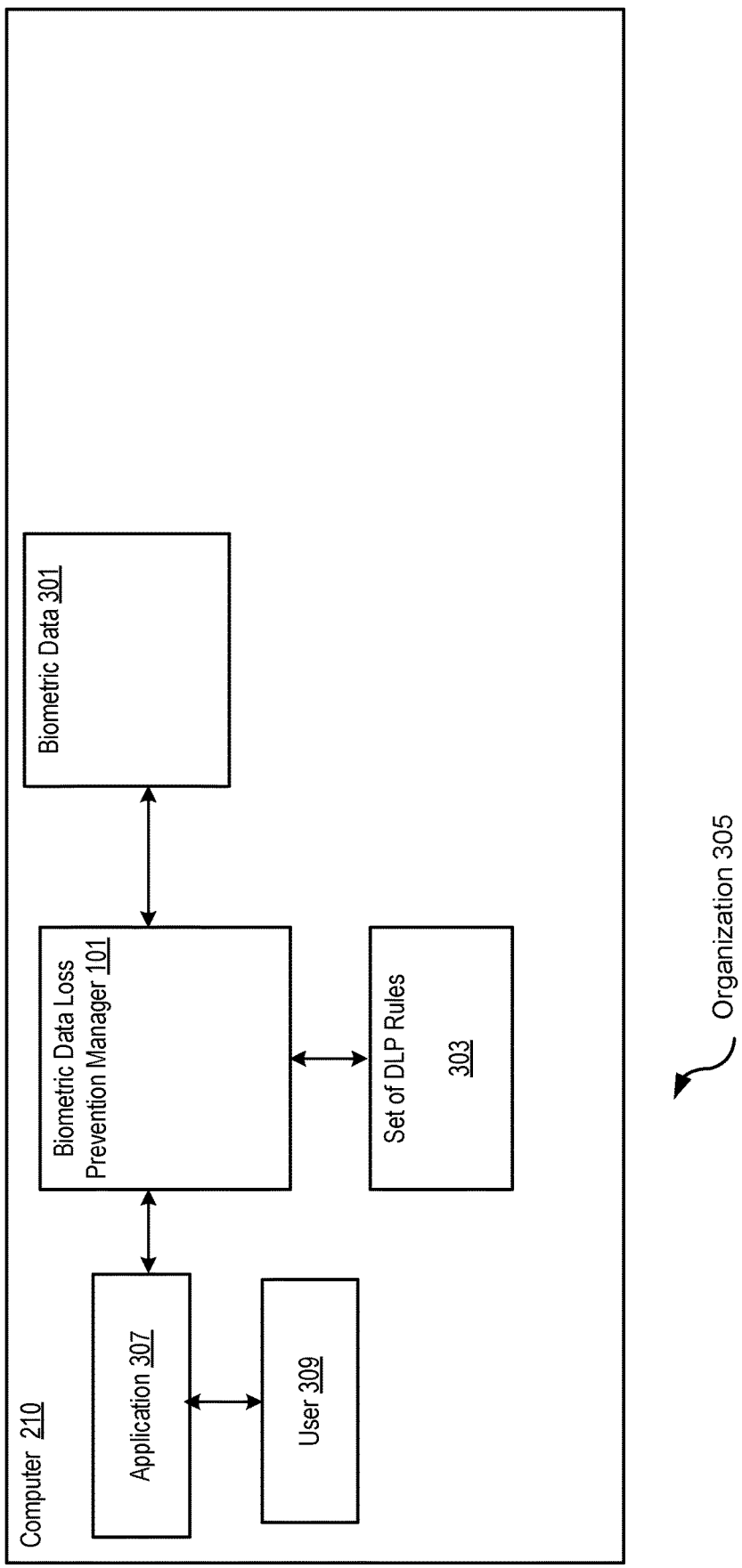
FIG. 3 is a block diagram of the operation of a biometric data loss prevention manager, according to some embodiments.

FIG. 3 illustrates the operation of a biometric data loss prevention manager 101, according to some embodiments. As described above, the functionalities of the biometric data loss prevention manager 101 can reside on a client 103, a server 105, or be distributed between multiple computer systems 210, including within a cloud-based computing environment in which the functionality of the biometric data loss prevention manager 101 is provided as a service over a network 107.

In the example embodiment illustrated in FIG. 3, a biometric data loss prevention manager 101 runs on an endpoint computer 210 (e.g., a client 103) within the network 107 of an organization 305 (e.g., an enterprise, university, governmental agency, family, household, etc.), and prevents the loss of biometric data 301. A set of data loss prevention ("DLP") rules 303 are created, maintained and enforced to regulate access, transmissions and/or other operations targeting biometric data 301. Although the example embodiment illustrated in FIG. 3 is instantiated in the context of an organization 305, in other embodiments the biometric data loss prevention manager 101 is instantiated in the context of an individual (e.g., as an app on a single smart phone, tablet or other type of computing device 210) and the scope of the DLP rules 305 is that single user. As discussed in more detail below, DLP rules 303 may specify which applications 307 and users 309 are and are not permitted to access given biometric data 301, and/or to perform specific actions thereon (e.g., attaching files containing given biometric data 301 to emails or text messages, posting biometric data 301 on social media sites or elsewhere on the internet, saving it to removable media, etc.). Specific properties concerning biometric data 301 may be utilized in the context of the DLP rules 303, such as identity, type, quality, quantity, etc. The biometric data loss prevention manager 101 can govern biometric data 301 in various processed formats, such as mathematical descriptions of facial geometry, fingerprint minutiae points, binary iris codes, etc., which in turn may be encrypted. Biometric data 301 that is in raw form may also be utilized, such as images of faces, fingerprints, iris scans, voice samples, etc. As described in detail below, the DLP rules 303 can govern the use of biometric data 301 at any desired level of detail and granularity. The biometric data loss prevention manager 101 detects attempts to access and utilize biometric data 301 on the computer 210, and allows or the blocks the attempted actions according to the DLP rules 303.

As used herein, "biometric data" mean data describing distinctive, measurable physiological characteristics and/or behavioral characteristics, used to label, describe and identify individual human beings (or other life forms). Such physiological characteristics may be related to the shape, configuration or form of the body, such as fingerprints, palm print, facial geometry, hand geometry, finger/palm veins, iris, retina, etc. Behavioral characteristics can be related to writing/typing habits, walking/running habits, etc. An individual's DNA is another biometric characteristic that can be described by biometric data, as are vocal tone, odor, gait and signature etc.

Figure 4:
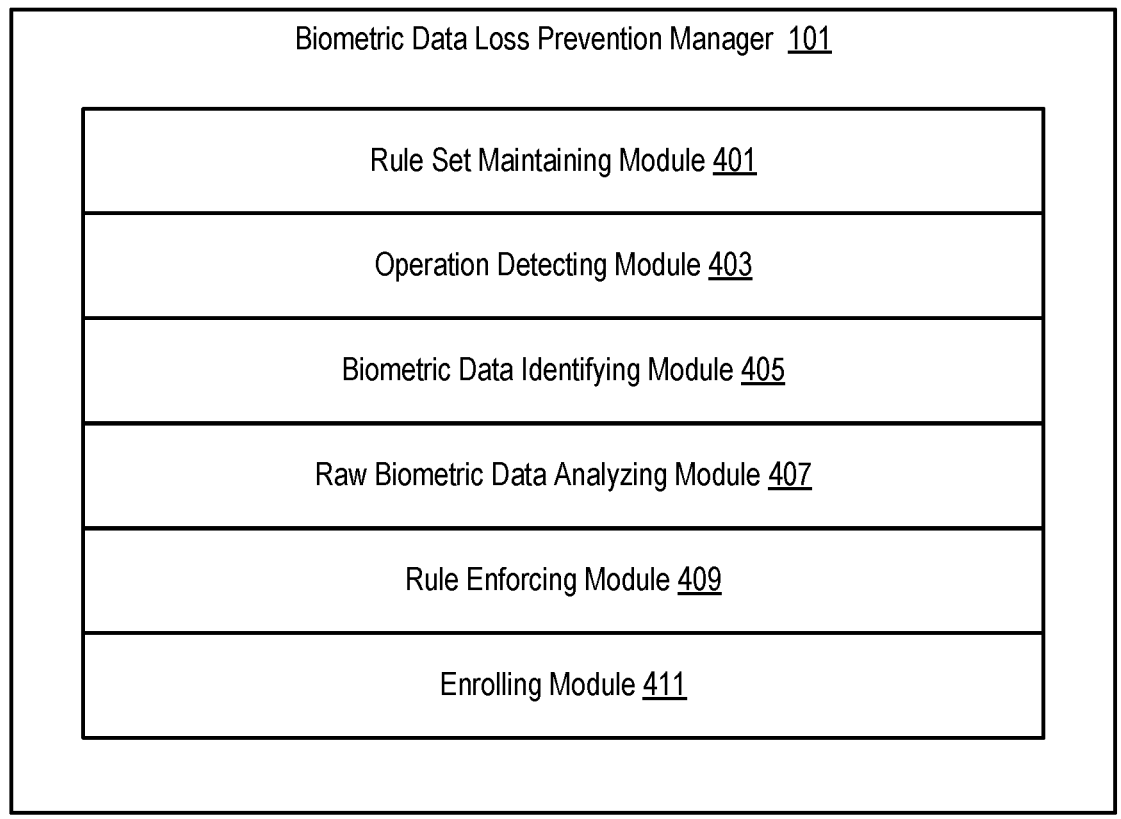
FIG. 4 is a block diagram of a biometric data loss prevention manager, according to some embodiments.

FIG. 4 illustrates a specific multiple module instantiation of a biometric data loss prevention manager 101, according to some embodiments. It is to be understood that although the biometric data loss prevention manager 101 is illustrated as a single entity, the illustrated biometric data loss prevention manager 101 represents a collection of functionalities, which can be instantiated as a single or multiple modules as desired (an instantiation of specific, multiple modules of the biometric data loss prevention manager 101 according to one embodiment is illustrated in FIG. 4). It is to be understood that the modules of the biometric data loss prevention manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the biometric data loss prevention manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Figure 5:
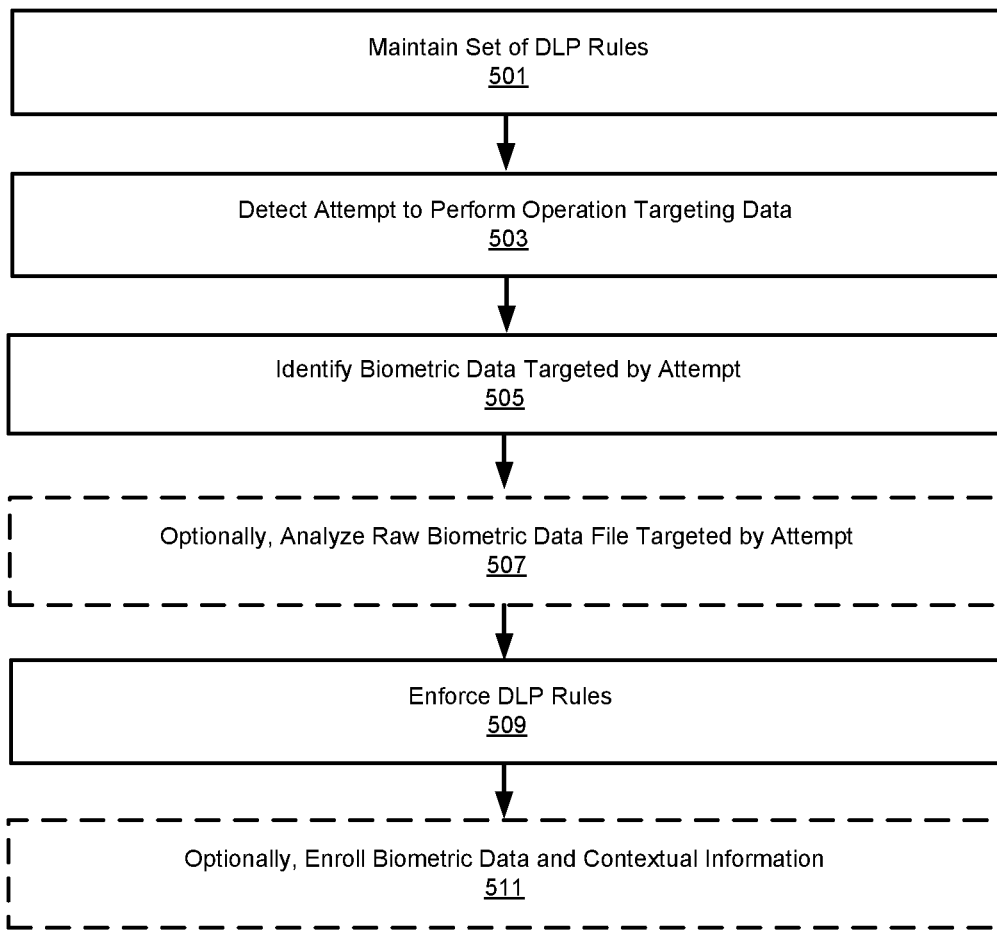
FIG. 5 is a flowchart illustrating steps performed by a biometric data loss prevention manager, according to some embodiments.

FIG. 5 illustrates steps executed by the biometric data loss prevention manager 101, according to some embodiments. For clarity of description, the subject matter illustrated in FIGS. 4 and 5 is described together below.

A rule set maintaining module 401 of the biometric data loss prevention manager 101 maintains 501 a set of DLP rules 303 specially configured for biometric data 301. By leveraging an understanding of the biometric data 301, the DLP rules 303 can flexibly specify how biometric data 301 may or may not be accessed and used by members of the organization 305 (or by individuals). The set may contain rules 303 based on types of biometric data 301, quality thereof, quantity thereof, the specific user 309 attempting the access or one or more group(s) to which the user 309 belongs, the specific application 307 or type of application 307 attempting the access (e.g., word processor, browser, email program, etc.), the targets of attempted transmissions, the specific people represented by the biometric data 301, relationships between them, as well as other factors and/or combinations of factors. The set of DLP rules 303 can specify the governance of biometric data 301 at any desired level of granularity.

An example rule 303 could specify that members of the organizations 305 (e.g., employees, students, etc.) may access only biometric data 301 pertaining to themselves and those they directly supervise. Another example rule 303 could specify that that only facial (and/or other types) of images below a given resolution threshold may be transmitted outside of the organization 305 (or off of the computing device 210). Yet another rule 303 could specify, for example, that members of the organizations 305 may transmit their own facial image outside of the organization 305, but not those of others. Such a rule 303 could further specify that members may not transmit any type of biometric data 301 other than facial images outside of the organization 305, even where the other biometric data 301 describe themselves. DLP rules 303 could also address quantity of biometric data 301, specifying for example that biometric data 301 pertaining to more than a threshold number of people cannot be accessed and/or sent out by specific individuals or generally (e.g., too many faces in the same picture, too many pictures attached to the same email, etc.). The DLP rules 303 can specify blocking, otherwise restricting or permitting any level or type of access, transmission and/or other usage of any biometric data 301, processed or raw, image or not image-based, according to any factors or conditions, such as the examples described above. It is to be understood that in different embodiments the DLP rules 303 can be provided, maintained, customized and/or updated by, for example, the publisher of the biometric data loss prevention manager 101, a third party security software vendor, a system level administrator in an the organization 305 in which the biometric data loss prevention manager 101 is operating, etc.

An operation detecting module 403 of the biometric data loss prevention manager 101 can detect 503 attempts to perform operations targeting data 301 on the computer system 210. To do so, the operation detecting module 403 can detect attempts to access files (or other units of data), for example by intercepting relevant system calls that access the file system. The specific system calls to intercept can vary between operating systems and versions thereof. In different embodiment, system calls that access files for reading, writing, copying, moving, etc., can be intercepted. The implementation mechanics of system call interception varies between operating systems. For example, under Windows interception can be implemented by using dynamic link library (DLL) injection or a kernel level filter driver. Under UNIX like operating systems, entries in the system call table can be overwritten. Under iOS, interceptions occur at runtime. Under Android, code is disassembled, modified, added to, and re-assembled. In any case, the operation detecting module 403 may monitor file access on the computer system 210. The exact functionality to monitor, and hence the specific system calls to intercept, can vary between embodiments. By monitoring the access of files, the operation detecting module 403 can detect attempts to access specific files and/or file types, which can be analyzed as described below to determine whether they contain biometric data 301, in order to enforce the set of DLP rules 303. In some embodiments, the operation detecting module 403 further tracks the specific users 309, processes and/or applications 307 that are attempting to access files, so that DLP rules 303 can be enforced at those levels of granularity. In some embodiments, access of only a subset of all files are monitored, such as files in specific formats, folders, etc. (e.g., those considered likely to contain biometric data 301).

In some embodiments, the operation detecting module 403 detects specific operations being attempted on the files being accessed, such as for example attempts to transfer files off of the computer system 210 (e.g., copy files to a network share, save files to an external USB device, attach files to an outbound email or text message, etc.). Under such scenarios, the specific files that are the targets of attempted transfer operations can be analyzed as described below to determine whether they contain biometric data 301. In some embodiments, the specific users 309, processes and/or applications 307 that are attempting to transmit files are monitored. In some embodiments, the target destinations of the attempted transfer operations are monitored. It is to be understood that which file operations to monitor (e.g., access, transfer, etc.) is a variable design parameter, as is the specific files and/or file types monitored (e.g., all files, only specific file formats, only files from specific sources, etc.) and the specific information tracked concerning the attempted operations (initiating application 307 and/or user 309, target of transfer, etc.), depending upon, for example, the level of granularity of the DLP rules 303 in the given embodiment.

A biometric data identifying module 405 of the biometric data loss prevention manager 101 can identify 505 biometric data 301 that is targeted by access attempts. When used for security or other purposes within an organization 305, biometric data 301 is frequently not stored as raw data format, such as images, but instead in the form of processed data, such as mathematical descriptions of facial geometry, fingerprint minutiae points, finger/palm veins, binary iris codes, retina descriptors, writing/typing habits, walking/running habits, DNA descriptors etc., which is in turn often encrypted. The biometric data identifying module 405 can examine any file (or other data storage format, such as a database record or the like) being targeted by an access operation, and identify biometric data 301 contained therein in different formats. To do so, the biometric data identifying module 405 may utilize plugins, application programming interface ("API"), libraries and/or other tools from third party biometric data vendors to recognize processed biometric data 301 in different formats. In different embodiments, for whichever particular formats and types of biometric data 301 a given organization 305 utilizes (e.g., those types of biometric data 301 the particular organization 305 uses in its internal security systems, maintains in its human resources records, etc.), the organization 305 may utilize tools from a corresponding third party biometric data vendor to manage this information (e.g., fingerprint minutiae points, binary iris codes, hand geometry lengths, ear shape descriptors, mathematical descriptions of voice signatures, etc.).

In some embodiments, for each type/format of biometric data 301 which the set of DLP rules 303 of the given organization 305 covers, the biometric data identifying module 405 can interact with a software tool provided by a corresponding third party vendor to determine if that type of biometric data 301 is present in a given file (or database record, etc.), and if so to interpret the biometric data 301 at a desired level of granularity. For example, in the case of fingerprints, the interpretation could indicate how many fingerprints are represented in the file, whose fingerprints these are, the relationships between these people within the organization 305, and/or other specific information depending upon the context, etc. In some embodiments, the publisher of the biometric data loss prevention manager 101 provides a software development kit ("SDK") to biometric data vendors, who in turn provide plugins or the like which can be called by the biometric data identifying module 405. Another option is for the biometric data identifying module 405 to call the biometric data vendor's API in instances where one is provided. In either case, by programmatically interfacing with a biometric data vendor's software, the biometric data identifying module 405 can identify biometric data 301, and learn its identity and context at any desired level of granularity. In other embodiments, some or all formats of biometric data 301 may be maintained and processed directly by the publisher of the biometric data loss prevention manager 101 and/or the organization 305.

Biometric data 301 can be also be present in raw data form, such as images of faces, fingerprints, palms, iris scans, voice samples, etc. In one embodiment, a raw biometric data analyzing module 407 of the biometric data loss prevention manager 101 analyzes 507 raw biometric data files targeted by access operations, and identifies raw biometric data 301 this way. The analysis of raw biometric data files can take the form of identifying biometric data 301 represented in the content of raw data files. Different types of biometric data 301 in the raw data files are identified in different embodiments. For example, in one embodiment graphical representations of faces are identified, e.g., by using facial recognition. Facial recognition algorithms and techniques are known to those of ordinary skill in the relevant art, and the implementation mechanics of their use within the context of the biometric data loss prevention manager 101 will be readily apparent to those of such a skill level in light of this specification. The facial recognition functionality can be implemented as part of the biometric data loss prevention manager 101, or as a third party library/service as desired.

Once a given image is determined to contain one or more faces, the individuals can be identified more specifically, for example by gleaning the information from an organization level or external database of known faces, from the user's social network(s), utilizing automatic computerized facial recognition to identify a specific person depicted by an identified graphical representation in the image file, etc. The identified faces can be further classified at any level of granularity, e.g., employees versus non-employees, hierarchical or other relationships between identified individuals, etc. Other forms of raw biometric data 301 noted above can be identified in similar ways. Note further that raw biometric data files are not limited to those containing visual images (e.g., formats such as JPEG, GIF, PNG, etc.) or video (e.g., MPEG, WMV, etc.), but can also include, for example, audio formats such as MP3, FLAC, ALAC, WAV, etc., which can contain biometric data 301 in the form of voice samples (e.g., voice recognition techniques can be used to identify vocal features in the audio files).

In other embodiments, the biometric data identifying module 405 and/or the raw biometric data analyzing module 407 can periodically traverse all or select parts the file system (or other data storage format, such as a database or the like) on the computer 210 (including any networked or shared disks, folders, etc.), and, using the techniques described above, identify files containing biometric data 301 in different formats. In this embodiment, the biometric data loss prevention manager 101 can store identifying information concerning the files checked for biometric data 301 (e.g., hashes, checksums, etc.), as well as information concerning any actual biometric data 301 identified in specific ones of the files. Then, when an access attempt targeting a given file is detected, the biometric data loss prevention manager 101 can determine whether the targeted file has been previously analyzed for biometric data 301 (e.g., by computing its hash and comparing it to the stored hashes). If so, the presence or lack of previously identified information concerning biometric data 301 contained in the file can be used to enforce the DLP rules 303 as described below. For instances in which the file has not been previously analyzed (e.g., there is not a stored matching hash, either because the file was created or modified since the last crawl through the file system), the biometric data identifying module 405 and/or the raw biometric data analyzing module 407 can identify any biometric data 301 that may be present in the file. In another embodiment, a filesystem filter driver is used to detect the creation of any new files containing biometric data 301, and/or the addition or modification of biometric data 301 in existing files. In other words, relevant filesystem operations are monitored to detect new files and/or edits to existing files, and the biometric data identifying module 405 and/or the raw biometric data analyzing module 407 identify any biometric data 301 in relevant file content.

A rule enforcing module 409 of the biometric data loss prevention manager 101 enforces 509 the DLP rules 303 when attempts to access, transfer and/or otherwise manipulate biometric data 301 are detected. Based on factors such as the particulars of the identified biometric data (e.g., type, identity, quality, quantity), the specific operation being attempted (read file, transfer file to any external computer 210, transfer file between computers 210 within the organization 305, transfer file to a computer 210 or storage medium outside of the organization 305, etc.), the rule enforcing module 409 can compare the set of circumstances to the set of DLP rules 303, and enforce any rules 303 governing the attempted operations. For example, various attempted operations can be permitted or blocked as per the DLP rules 303. In some embodiments, additional or other actions are also executed by the rule enforcing module 409, such as redacting the biometric data 301 but otherwise allowing the operation, automatically sending a notification concerning the attempted operation to an administrator or other party, etc. It is to be understood that the specific rules 303 that are enforced, as well as the various parameters on which the rules 303 are based (e.g., the properties of the biometric data 301 itself, the party or application 307 attempting the operation, the target destination of the attempted transfer operation) can vary between embodiments as desired.

Some examples of enforcing DLP rules 303 are now described. It is to be understood that these are non-exhaustive examples only. Suppose a given DLP rule 303 specifies that no fingerprint data is to be transferred from the organization 305 to any outside destination. In response to the operation detecting module 403 detecting any attempt to transmit a file containing mathematical descriptions of one or more fingerprints (as identified by the biometric data identifying module 405, interfacing with, e.g., the fingerprint processing vendor's SDK), the rule enforcing module 409 would block the attempted file transfer. On the other hand, if the rule 303 permitted the user 309 to transfer data concerning his own fingerprints but not those of others, the attempt would be either permitted or blocked depending upon whether the file in questions contains only data representing the user's own fingerprints (permitted), or those of one or more other parties (blocked).

A few examples concern biometric data 301 in the form of facial images are now provided. In one embodiment, suppose a specific DLP rule 303 specifies that users 309 may transmit images of their faces to any destination, including outside of the organization 305. In response to the operation detecting module 403 detecting an attempt by the user 309 to, e.g., attach an image file to an email, the raw biometric data analyzing module 407 determines that the image in question is of the user's own face (e.g., by comparing the facial area in the image with the user's HR directory photo or other enrollment data). In this case, the rule enforcing module 409 would allow the email program to transmit the attached image file, as no DLP rule 303 is violated. Suppose another rule 303 specifies that users 309 are forbidden from sending out pictures of other employees of the organization 305, but pictures of non-employees may be transmitted. In response to detecting the user 309 attempting to upload an image of, e.g., his/her boss to an external server 105, the rule enforcing module 409 would block the attempted transfer to enforce the rule 303. On the other hand, if the image only contains photos of non-employees (e.g., members of the user's family), the transfer would be allowed. In the case of an image depicting both employees and non-employees, the transfer could be blocked outright, or the image could be modified to redact only the employees, as directed by the specific rule 303.

In order to enforce DLP rules 303 that are based on identification (e.g., who is represented by the biometric data 301) and/or relationships (who works within the organization 305, who supervises whom, etc.), an enrolling module 411 of the of the biometric data loss prevention manager 101 may enroll 511 various data with the system. For example, the enrolling module 411 may automatically process information in organization directories (e.g., stored facial images, badge photographs, org charts, etc.), and enroll relevant data with the biometric data loss prevention manager 101. The enrolling module 411 may also programmatically interact with third party vendors managing various types of biometric data 301 for the organization 305 (e.g., identification and context of, for example, facial geometry or iris scans of employees used by an authentication system), and enroll corresponding biometric data 301 and related (e.g., contextual) information processed by these vendors. In other words, the enrolling module 411 can glean and maintain information about biometric data 301 known to the organization 305, (e.g., the identities of the parties represented by various fingerprints, facial images and other biometric data 301, as well their positions within the organization 305 and the relationships between them). In another embodiment, the enrolling module 411 can glean and maintain information about biometric data 301 from sources concerning an individual, such as the individual's presence on social media/networks. This enrolled data can subsequently be used by the rule enforcing module 409 in the enforcement of DLP rules 303, as attempts are made to access and transfer biometric data 301, as described above.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A method for preventing loss of biometric data on a computing device, the method comprising:
   automatically enrolling previously processed biometric data;
   detecting an attempt to perform an operation targeting data on the computing device;
   identifying that the data targeted by the attempted operation comprises biometric data;
   determining whether the attempted operation targeting biometric data is permitted, according to a set of data loss prevention ("DLP") rules, wherein enforcing the set of DLP rules uses the enrolled biometric data; and
   responsive to determining that the attempted operation targeting the biometric data is not permitted, blocking the attempted operation.

2. The method of claim 1 wherein detecting an attempt to perform an operation targeting data on the computing device further comprises:
   detecting an attempt to transfer a file off the computing device.

3. The method of claim 2 wherein detecting an attempt to transfer a file off the computing device further comprises detecting an attempt to perform an action from a group of actions consisting of:
   copying the file to a network share, saving the file to a removable medium, attaching the file to an email, attaching the file to a text message, and copying the file to a remote computer.

4. The method of claim 2 wherein detecting an attempt to transfer a file off the computing device further comprises:
   tracking a destination of the detected attempt to transfer the file off the computing device.

5. The method of claim 1 wherein detecting an attempt to perform an operation targeting data on the computing device further comprises:
   tracking a user or an application that initiated the detected attempt to perform the operation targeting data on the computing device.

6. The method of claim 1 wherein identifying that the data targeted by the attempted operation comprises biometric data further comprises:
   identifying specific biometric data being targeted by the attempted operation.

7. The method of claim 1 wherein identifying that the data targeted by the attempted operation comprises biometric data further comprises:
   identifying biometric data in a specific format.

8. The method of claim 7 wherein identifying biometric data in a specific format further comprises:
   programmatically interfacing with a software tool that processes biometric data in the specific format.

9. The method of claim 1 wherein identifying that the data targeted by the attempted operation comprises biometric data further comprises identifying a specific type of biometric data from a group consisting of:
   mathematical descriptions of facial geometry, mathematical descriptions of hand geometry, mathematical descriptions of finger/palm veins, ear shape descriptors, mathematical descriptions of voice signatures, mathematical descriptions of writing/typing habits, mathematical descriptions of walking/running habits, fingerprint minutiae points, binary iris codes, retina descriptors, and DNA descriptors.

10. The method of claim 1 wherein identifying that the data targeted by the attempted operation comprises biometric data further comprises:
    analyzing an image file; and
    identifying biometric data in the raw data file.

11. The method of claim 10 further comprising:
    utilizing automated facial recognition to identify at least one facial image in the image file.

12. The method of claim 1 further comprising:
    enforcing a specific DLP rule governing the attempted operation targeting the biometric data based on a specific type of the biometric data.

13. The method of claim 1 further comprising:
    enforcing a specific DLP rule governing the attempted operation targeting the biometric data based on quantity of the biometric data.

14. The method of claim 1 further comprising:
    enforcing a specific DLP rule governing the attempted operation targeting the biometric data based on quality of the biometric data.

15. The method of claim 1 further comprising:
    enforcing a specific DLP rule governing the attempted operation targeting the biometric data based on a target of an attempt to transmit the biometric data off the computing device.

16. The method of claim 1 further comprising:
    enforcing a specific DLP rule governing the attempted operation targeting the biometric data based on at least one specific person represented by the biometric data.

17. The method of claim 1 further comprising:
    enforcing a specific DLP rule governing the attempted operation targeting the biometric data based on a relationship between at least one specific person represented by the biometric data and a user that initiated the attempted operation.

18. The method of claim 1 further comprising:
    enforcing a specific DLP rule governing the attempted operation targeting the biometric data based on a user or an application that initiated the attempted operation.

19. The method of claim 1 further comprising:
    detecting a second attempt to perform an operation targeting data on the computing device;
    identifying that the data targeted by the second attempted operation comprises biometric data;
    determining that the second attempted operation targeting biometric data is permitted, according to the set DLP rules; and
    responsive to determining that the second attempted operation targeting the biometric data is permitted, permitting execution of the second attempted operation.

20. The method of claim 1 further comprising:
    automatically processing biometric data and contextual information maintained by an organization or individual;
    enrolling the automatically processed biometric data and contextual information; and
    using enrolled biometric data and contextual information in enforcement of the set of DLP rules.

* * * * *